July 27, 1937.　　　H. A. ROSE ET AL　　　2,088,483
CONTROL SYSTEM FOR A VAPOR ELECTRIC CONVERTER
Filed Nov. 29, 1935　　　3 Sheets-Sheet 2

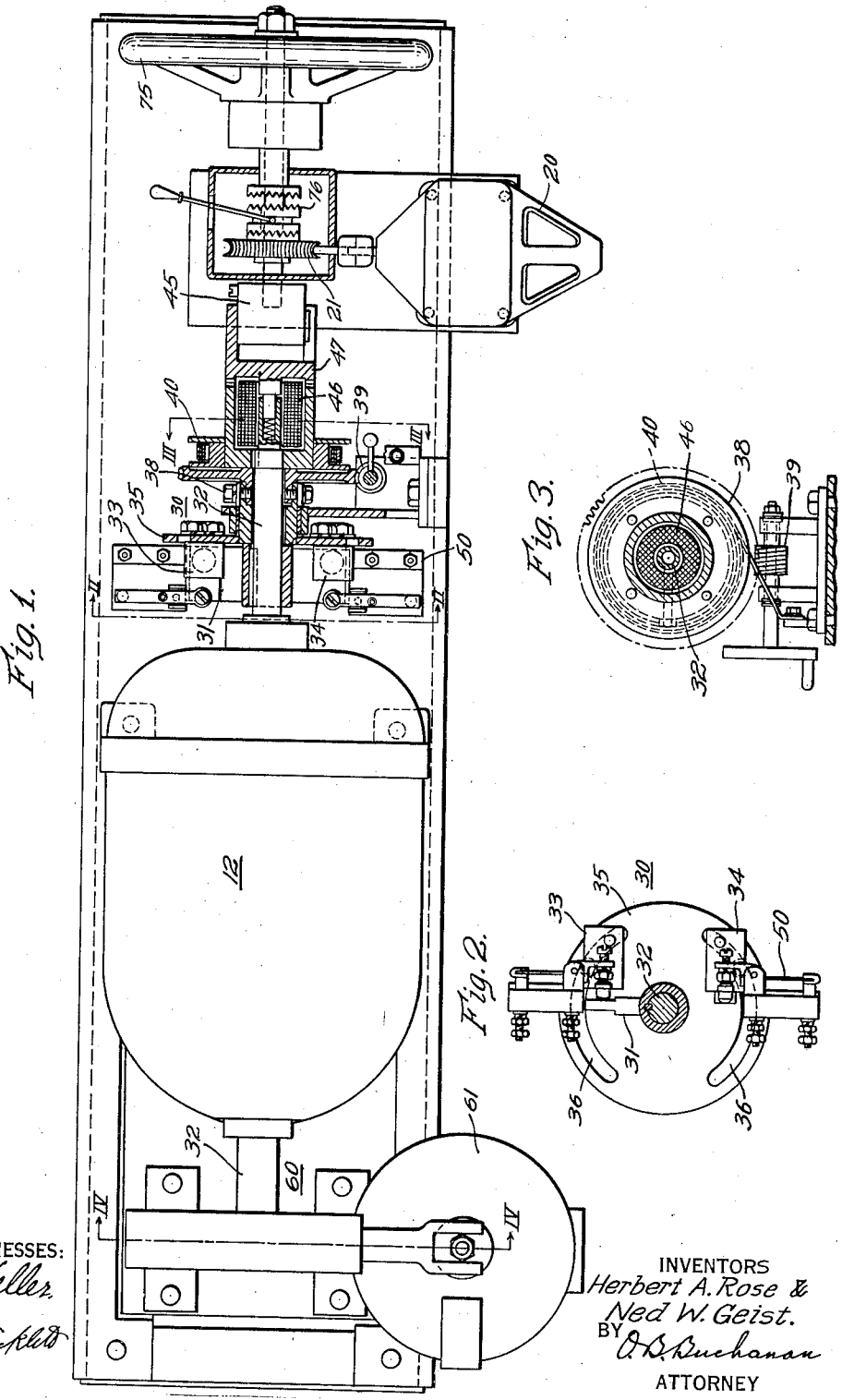

WITNESSES:
C. N. Evans
S A Strickled

INVENTORS
Herbert A. Rose &
Ned W. Geist.
BY
O. D. Buchanan
ATTORNEY

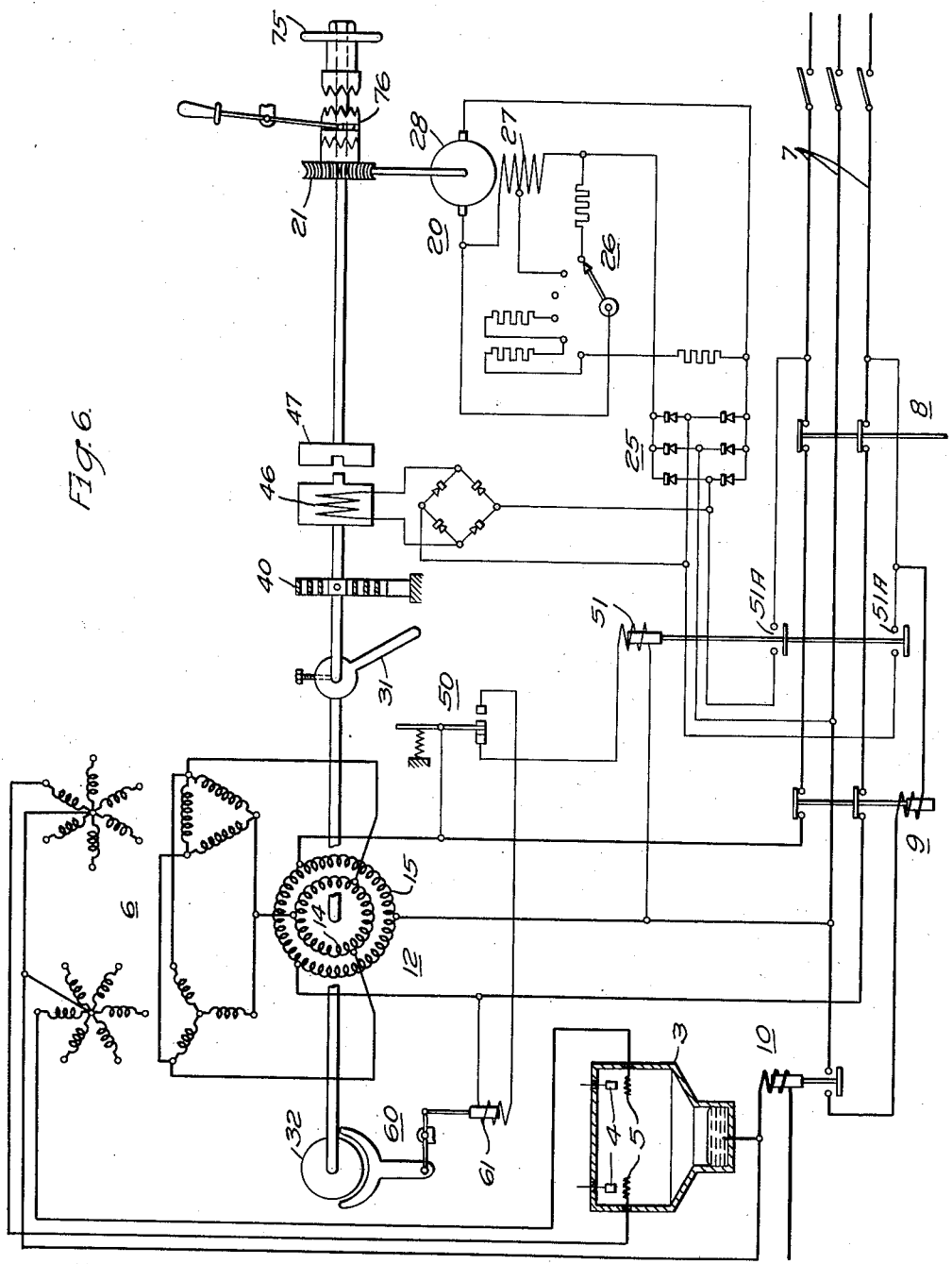

Patented July 27, 1937

2,088,483

UNITED STATES PATENT OFFICE 2,088,483

CONTROL SYSTEM FOR A VAPOR ELECTRIC CONVERTER

Herbert A. Rose, Pittsburgh, and Ned W. Geist, Edgewood, Pa., assignors to Westinghouse Electric & Manufacturing Company, East Pittsburgh, Pa., a corporation of Pennsylvania Application November 29, 1935, Serial No. 52,202

12 Claims. (Cl. 175—363)

Our invention relates to a control system for a vapor electric converter and particularly to a system for determining and maintaining the initial and operating voltages delivered by such a converter.

In the application of vapor electric converters it is frequently desirable to initiate operation of the converter at a predetermined terminal voltage and to change the terminal voltage a predetermined amount in a predetermined time in order to secure the best operating condition of the apparatus supplied by the converter.

In certain applications it may be desirable to provide a high initial terminal voltage in order to break down the initial resistance of the load and then to operate at a potential somewhat lower than the initial potential. It is also frequently desirable to initiate operation at a reduced potential and to gradually increase the potential to a normal operating potential.

In control rectifiers this may be done by adjusting the phase angle of the control potential with respect to the phase of the potential supplied to the anodes of the converter, and after the initial operation is begun to gradually adjust the phase relation of the control potential to either raise or lower the output potential of the converter as may be desired. Preferably, this adjustment should be made in a predetermined time, depending upon the conditions of the load.

Our invention relates to a control system in which the maximum and minimum output potentials may be manually adjusted and in which the time interval during which the output potential is varied from maximum to minimum may be predetermined. We accomplish this result by means of a special electro-mechanical phase shifter in which the initial and final phase positions are determined by manual setting of suitable stop mechanisms and the change is automatically accomplished by means of a motor, the speed ratio of which may be manually determined, after which the action is substantially automatic.

It is accordingly an object of our invention to provide a phase shifting mechanism in which the maximum and minimum output potentials may be manually adjusted.

It is a further object of our invention to provide an adjustable element for predetermining the time interval between the application of maximum and minimum terminal voltage.

It is a further object of our invention to provide a control mechanism in which the time instant of the initiation of the anode arcs may be readily adjusted to any load condition.

It is a further object of our invention to provide a control mechanism responsive to fault conditions on the converter for returning the control mechanisms to the initial starting position.

It is a further object of our invention to provide a control system in which the terminal voltage of the converter will be adjusted a predetermined amount in a predetermined time, after which the terminal voltage will be held constant throughout normal operation of the converter.

It is a further object of our invention to provide a control system which is automatically responsive to faults to automatically return the terminal voltage to its normal starting value and thereafter automatically return the voltage to a normal value.

Other objects and advantages of our invention will be apparent from the following detailed description, taken in conjunction with the accompanying drawings, in which—

Figure 1 is a view, partially in section, of the mechanical arrangement according to our invention.

Fig. 2 is a detailed view taken on line II—II of Fig. 1 showing the adjustable stop mechanism according to our invention.

Fig. 3 is a detailed illustration taken on line III—III of Fig. 1 showing the return mechanism according to our invention.

Fig. 6 is a schematic representation of a control system according to our invention.

Figure 4:
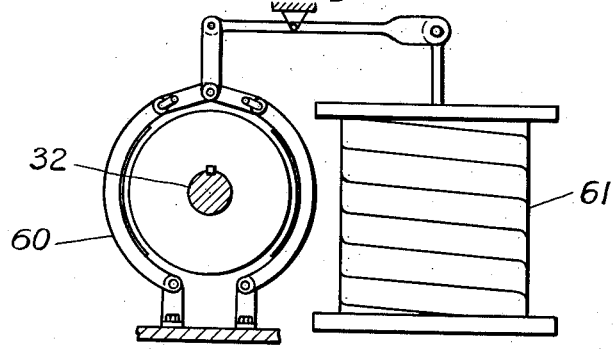
Fig. 4 is an illustration taken on line IV—IV of Fig. 1 showing the brake mechanism for maintaining the phase shifter in a predetermined position.
Figure 5:
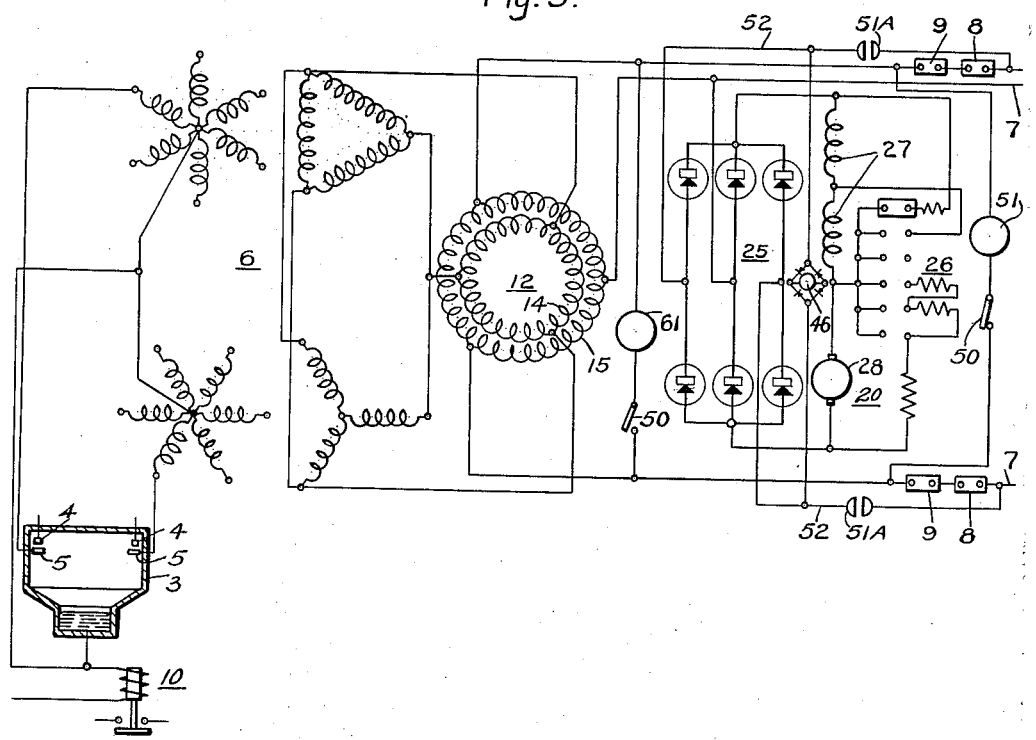
Fig. 5 is a diagrammatic illustration of a control system according to our invention.

Apparatus according to the illustrated embodiment of our invention comprises a vapor electric device 3 having a plurality of valves 4 for transferring energy between the two electrical distribution systems. Each valve 4 of the converter 3 is provided with a suitable control electrode such as a control grid 5. Control potential is supplied to these electrodes 5 by means of any suitable control device such as an impulse transformer 6. Control energy is supplied to the control device 6 by a supply circuit 7 from any suitable source, not shown. Suitable switches or circuit breakers 8 which may be either automatically or manually operated are inserted in the supply circuit 7 to permit control of the energization of the control device 6. Preferably the supply circuit 7 is also supplied with a circuit breaker device 9 controlled by a relay system 10 responsive to current conditions in the converter 3 for automatically interrupting the supply of control potential in response to abnormal current conditions such as overload or arc-back in the converter 3.

Connected in series with the supply circuit 7 and the control device 6 is a suitable phase shifter such as the rotary induction phase-shifter 12 illustrated.

Preferably this phase shifter 12 is provided with separate primary and secondary windings 14—15 which may be of any phase relation desired and which we have illustrated as being three-phase to three-phase although obviously it could be three-phase to six-phase or any other desired combination. Obviously it is also possible and sometimes desirable to eliminate the control transformer 6 and wind the secondary 15 of the phase shifter 12 with the necessary phases to be directly connected to the control electrodes 5.

A suitable driving motor 20 is provided for rotating the phase shifter 12 through any desired angle. Preferably this motor 20 operates through a gear train 21 to operate the phase shifter 12 at a speed other than that of the driving motor 20. If desired, this gear train 21 may be provided with suitable gear shifts, not shown, to change the speed ratio between the driving motor 20 and the phase shifting device 12. Also, we prefer to provide a driving motor 20 which is capable of speed adjustment over a wide range to further increase the available operating speeds of the phase shifter 12. For this purpose we use a direct current motor and provide a suitable rectifying device 25, preferably energized from the supply circuit 7, the direct current terminals of the rectifying device 25 being connected to our special motor 20 which we have illustrated as of the series field type having a manually adjustable controller 26 for controlling the strength of the series field 27 and the current through the rotor 28.

A suitable stop mechanism 30 is provided for controlling the position and the angle through which the phase shifter 12 may be adjusted. For this purpose we have provided a stop member 31 rigidly secured to the driving shaft 32 of the phase shifter 12 and a plurality of stop mechanisms 33—34 contacted by the stop member 31. Preferably, the stop mechanisms 33—34 are mounted on a drum or disk 35 which may be provided with slots 36 so that the stop mechanisms 33—34 may be adjusted to permit any desired angle of rotation of the phase shifter 12. In order to permit the desired adjustment of the initial position of the stop mechanism 30 the carrying plate 35 for the stop mechanisms 33—34 is generally mounted in rotatable relation to the shaft 32 of the phase shifting device 12 and a suitable device such as a worm gear 38 and driving gear 39 is provided for rotating the carrier plate 35 to any desired position.

Suitable means are provided for urging the stop member 31 against a predetermined one of the stop mechanisms 33—34. While any suitable device may be used, we have illustrated a spiral spring 40, one end of which is permanently connected to the shaft 32 of the phase shifter 12 and the other end is anchored to any suitable support. This spring 40 is so positioned and tensioned that it will normally rotate the phase shifter so that the stop member 31 is against one of the stop mechanisms such as 33 and is so positioned that the driving motor 20 will operate the phase shifter 12 in opposition to the tension of the spring 40 so that in the event the motor 20 is disconnected the spring 40 will tend to return the phase shifter 12 to its initial position.

The driving motor 20 is connected in driving relation to the phase shifter by means of a suitable clutch mechanism between an extension of the shaft 32 of the phase shifter 12 and a driving shaft 45 driven through the before-mentioned gear train 21. While any suitable clutch mechanism may be used, we prefer to utilize a magnetic clutch and for purposes of illustration we have shown the actuating coil 46 of the clutch rigidly connected to an extension of the shaft 32 and cooperating with an armature 47 slidably engaging an extension of the drive shaft 45. For controlling the driving motor 20 and the magnetic clutch, we have provided a limit switch 50 operatively connected to the stop mechanism 34 so that when the phase shifter is in its normal deenergized position, as determined by the resilient member 40, the limit switch 50 closes a circuit to relay 51, having contacts 51A which, in turn, determines the energization of an auxiliary circuit 52 connected to the supply circuit 7 so that upon deenergization of the control device 6, the relay 51 will be operative to energize the auxiliary circuit 52 and thereby energize the driving motor 20 and the coil 46 of the magnetic clutch 47 for operatively connecting the motor 20 to the phase shifting device 12. The switching device 50 is further actuated by the stop member 31 so that when the phase shifter 12 has been rotated through the angle determined by the position of the stop members 33—34, the relay 51 controlling the energization of the auxiliary circuit 52 will be deenergized which will drop out to deenergize the driving motor 20 and the magnetic clutch 47 so that the phase shifter 6 is no longer operatively connected to its driving motor 20.

Under such conditions the phase shifter 12 would then be returned to its initial position by the spring 40. However, it is usually desirable to maintain the phase shifter 12 in its terminal position and for this purpose we have provided a brake mechanism 60 cooperating with an extension of the phase shifter shaft 32 and operative by the switching device 50 actuated by the stop 31.

While any suitable brake may be used, we prefer to utilize a magnetic actuated brake, the circuit of which is controlled by the limit switch 50 so that when the phase shifter 12 is rotated through its predetermined angle the limit switch on the stop mechanism 34 will be operated to energize the brake coil 61 at the same time that the auxiliary circuit 52 supplying the driving motor 20 and the magnetic clutch 46 is deenergized. Obviously the deenergization of the driving motor 20 and the clutch coil 46 may be made dependent upon the operation of the brake mechanism 60.

In the operation of the control system according to our invention, the switching device 8 in the supply circuit 7 is closed either manually or automatically as may be desired and in the event that the current condition in the converter is normal, the series switch 9 controlled by the condition relay will be closed and power will be supplied to the control device 6. The phase shifting mechanism 12 will be urged to its initial setting position by the spring 40 and, therefore, the limit switch 50 will be open. The relay 51 across the supply circuit 7 thereby closes its contacts in the auxiliary circuit 52, supplying energy to the magnetic clutch 46 and the driving motor 20 which thereby drives the gear train to rotate the phase shifter 12 until the stop member 31 actuates the limit switch 50 to set the brake 60 and deenergize the magnetic clutch 46 in the driving motor 20. The brake 60 then holds the phase shifter 12 in its advanced position until either the supply circuit 7 is broken in response to a control action or until the auxiliary switch 9 is opened in response to an abnormal current condition in the converter 3. The releasing of the brake mechanism 60 permits the phase shifter 12 to return to its initial position under the influence of the resilient element 40.

In the event that the circuit 7 was opened because of an abnormal current condition in the converter 3, it will be reclosed as soon as this abnormal condition has disappeared or, if desired, a suitable time delay device (not shown) may be inserted to prevent restarting for a predetermined time interval. However, as soon as the circuit 7 is again closed, restarting will be in exactly the sequence as normal starting described above.

When testing or adjusting the converter system it is frequently desirable to have manual control of the position of the phase shifter 12. For this purpose, we have provided a hand wheel 75 which may be operatively engaged with the driving shaft 45 and for providing this engagement a suitable clutch 76 is arranged so that the driving motor 20 and its gear chain 21 may be disconnected from the drive shaft 45 and the hand wheel 75 connected so that control of the angular position of the phase shifter 12 is transferred from the driving motor 20 to the hand wheel 75.

While for purposes of illustration, we have described a specific embodiment of our invention, it will be apparent that many changes and modifications can be made therein without departing from the true spirit of our invention and the scope of the appended claims.

We claim as our invention:

1. In a control system for a vapor electric converter, a plurality of control electrodes, a control device for supplying potential to said control electrodes, a supply circuit for supplying energy to said supply device, an induction phase shifter in series with said supply circuit, a driving motor for said phase shifter, a magnetic clutch for operatively connecting said motor to said phase shifter, an auxiliary circuit for supplying energy to said motor and to said clutch, a rectifying device in said auxiliary circuit for supplying direct current energy to said motor, means for adjusting the speed of said motor, a stop mechanism for determining the initial position of said phase shifter, said stop mechanism having adjustable stops, a stop element operatively connected to said phase shifter and cooperative to said stop mechanism to determine the angular rotation of said phase shifter, a switch mechanism associated with said stop mechanism, a magnetic brake cooperative with said phase shifter, said magnetic brake being energized by said switching mechanism and means actuated by said stop mechanism for deenergizing said driving motor and said clutch mechanism and means responsive to abnormal current conditions in said converter for deenergizing said control system.

2. In a variable voltage electric conversion system, a control system for determining the terminal voltage of said conversion system comprising control electrodes associated with said conversion system, an impulse device for supplying control potential to said control electrodes, a source of energy connected to said control device, a phase shifting device for shifting the phase of the potential supplied by said control device, a stop mechanism for predetermining the angle through which the phase may be shifted by said phase shifter, a motor for operating said phase shifter, means for controlling the speed of said motor, means for operatively connecting said motor to said phase shifter whereby said phase shifter is operated through a predetermined angle in a predetermined time and means responsive to the rotation of said phase shifter to deenergize said motor and means responsive to an abnormal current condition in said converter for returning the phase shifter to its initial position.

3. A control system for a multi-valve vapor-electric converter having a control electrode associated with each valve of the converter, comprising a control device having terminals connected to said control electrodes, a supply circuit for said control device, a circuit breaker in said circuit for controlling the energization of said control device, a rotary phase shifting device in said circuit, a stop mechanism associated with said phase shifter, said stop mechanism being adjustable for determining the angle through which said phase shifter may be rotated, means for urging said phase shifter toward one of said stop mechanisms, a motor for rotating said phase shifter against said means, a clutch for connecting said motor to said phase shifter, means responsive to energization of said control device to energize said motor and engage said clutch, a brake device associated with said phase shifter, means responsive to rotation of said phase shifter through the angle set by said stop mechanism for operating said brake, further means responsive to rotation of said phase shifter for deenergizing said motor and disengaging said clutch.

4. A control system for a vapor electric converter having a plurality of arc paths and a control electrode associated with each arc path, comprising a control device for supplying control potential to said control electrodes, a supply circuit for said control device, means in said circuit for controlling the energization of said control device, a rotary phase shifter in said circuit, a stop mechanism associated with said phase shifter, said stop mechanism being adjustable to determine the position and magnitude of the angle through which said phase shifter may be rotated, means for urging said phase shifter against one member of said stop mechanism, a motor for rotating said phase shifter against said means, a magnetic clutch for connecting said motor to said phase shifter, means responsive to energization of said control device for energizing said motor and said clutch, a brake device for said phase shifter and switching means operated by said stop mechanism for deenergizing said motor and said clutch and actuating said brake device upon rotation of said phase shifter through the angle set by said stop mechanism.

5. A control system for a vapor electric converter having a plurality of valves and a control electrode for each valve of the converter, comprising a control transformer for supplying control potential to said electrodes, a supply circuit for said transformer, an induction phase shifter in said circuit, a stop mechanism for determining the angle through which said phase shifter can operate, means for normally urging said phase shifter toward a predetermined position, a motor for rotating said phase shifter, means for operatively connecting said motor to said phase shifter, a switching device associated with said stop mechanism, said switching device being operative when said phase shifter is in a predetermined position for energizing said motor and operative when said phase shifter is in a second predetermined position for deenergizing said motor.

6. A control system for a vapor-electric converter having control electrodes for the valves of the converter, comprising a control transformer having secondary terminals connected to said control electrodes, a supply circuit for said transformer, an induction phase shifter in said circuit, a motor for said phase shifter, means for adjusting the driving speed of said motor, a clutch for connecting said motor to said phase shifter, an energy storing device connected to said phase shifter, a stop mechanism for limiting the movement of said phase shifter and means actuated by said stop mechanism for deenergizing said motor and disengaging said clutch.

7. A control system for a vapor electric converter having control electrodes for the valves of the converter, comprising a control transformer having secondary terminals connected to said control electrodes, a supply circuit for said transformer, an induction phase shifter in said circuit, a motor for said phase shifter, means for adjusting the driving speed of said motor, a clutch for connecting said motor to said phase shifter, an energy storing device connected to said phase shifter, a stop mechanism for limiting the movement of said phase shifter and means actuated by said stop mechanism for deenergizing said motor and disengaging said clutch, a brake mechanism cooperating with said phase shifter and means actuated by said stop mechanism for setting said brake to maintain said phase shifter against the action of said energy storing device.

8. In a control system for a valve type converter an electro-mechanical phase shifter comprising two windings movable with respect to each other, means for automatically changing the relative respective position of said windings, means for locking said movable windings in predetermined positions, energy storing means for returning said movable windings to a normal deenergized position, means for disconnecting said first mentioned means from said phase shifter so as to reduce the inertia of the parts to be returned to the normal deenergized position.

9. An electric phase position controller having a movable winding, mechanical means for determining the normal energized and deenergized position of said movable winding, mechanical means for adjusting the operative angular position of said rotor, a torque mechanism possessing stored mechanical energy adaptable for moving said rotor, an electric torque device for driving the mechanism of said phase shifter and a cooperating electrical clutch for engaging said mechanism.

10. An electric phase position controller having a rotor winding, mechanical means for determining the normal energized and deenergized position of said rotor, mechanical means for adjusting the operative angular position of said rotor, a torque mechanism possessing stored mechanical energy adaptable for moving said rotor, an electric torque device for driving the mechanism of said phase shifter and a cooperating electrical clutch for engaging said mechanism and electrical interlocks associated with the movable part of said mechanism for automatically controlling the operation of said system.

11. An electro-mechanical phase shifter comprising relatively rotatable windings, driving means associated with a mechanism for changing the relative angular position of said windings, means for returning said winding to the initial angular relation upon deenergization of said driving means and a clutch cooperating between said phase shifter and said driving mechanism whereby said driving mechanism operates to drive the rotatable winding in only one direction.

12. In a control system for supplying control potential to the control electrode of a valve type converter, a phase shifter for controlling the phase relation of the control potential comprising a stator member and a rotor member, a stop mechanism associated with said phase shifter, said stop mechanism having stop elements cooperating with a stop member on said rotor member, means for urging said stop member against one of said stop elements, said stop element being independently adjustable to determine the angle through which said rotor member may operate, means for adjusting said stop mechanism to determine the position of the angle through which the rotor member may operate, a motor for rotating said rotor member against said urging means, a magnetic clutch for connecting said motor to said rotor member, means for energizing said motor and said clutch, a brake device for said rotor member and switching means operated by said stop mechanism for actuating said brake device and for deenergizing said motor and said clutch upon rotation of said rotor member through the angle set by said stop mechanism.

HERBERT A. ROSE.
NED W. GEIST.